United States Patent
Kratzer

(10) Patent No.: US 8,479,773 B2
(45) Date of Patent: Jul. 9, 2013

(54) HYDRAULIC UNIT

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 797 days.

(21) Appl. No.: 12/162,154

(22) PCT Filed: Dec. 4, 2006

(86) PCT No.: PCT/EP2006/069253
§ 371 (c)(1),
(2), (4) Date: Jul. 25, 2008

(87) PCT Pub. No.: WO2007/085319
PCT Pub. Date: Aug. 2, 2007

(65) Prior Publication Data
US 2009/0000467 A1     Jan. 1, 2009

(30) Foreign Application Priority Data
Jan. 27, 2006  (DE) .......................... 10 2006 003 858

(51) Int. Cl.
*F16K 11/24*    (2006.01)
(52) U.S. Cl.
USPC ........................................................ 137/884
(58) Field of Classification Search
USPC ...................................... 137/884; 303/119.2
See application file for complete search history.

(56) References Cited

U.S. PATENT DOCUMENTS

| | | | |
|---|---|---|---|
| 4,678,006 A | | 7/1987 | Northman et al. |
| 4,785,848 A | * | 11/1988 | Leiber ...................... 137/596.17 |
| 4,913,189 A | * | 4/1990 | Kline et al. .................... 137/560 |
| 5,275,478 A | * | 1/1994 | Schmitt et al. ............. 303/119.2 |
| 5,374,114 A | * | 12/1994 | Burgdorf et al. ........... 303/119.2 |
| 5,836,354 A | * | 11/1998 | Amano et al. ................ 137/884 |
| 5,845,672 A | * | 12/1998 | Reuter et al. ............. 137/315.03 |
| 5,887,624 A | * | 3/1999 | Taniguchi et al. ............ 137/884 |
| 6,000,679 A | * | 12/1999 | Reuter et al. ............. 251/129.15 |
| 6,371,166 B1 | * | 4/2002 | Yoshizawa et al. ........... 137/884 |
| 6,616,249 B2 | * | 9/2003 | Han ........................... 303/119.3 |
| 6,731,192 B1 | * | 5/2004 | Moreno et al. ................ 335/256 |
| 6,985,060 B2 | * | 1/2006 | Parker et al. .................. 335/282 |

FOREIGN PATENT DOCUMENTS

| | | |
|---|---|---|
| DE | 37 09 505 A1 | 1/1988 |
| DE | 41 00 967 A1 | 7/1992 |
| DE | 41 33 641 A1 | 4/1993 |
| DE | 195 18 519 A1 | 11/1996 |
| DE | 103 16 643 A1 | 11/2004 |

* cited by examiner

*Primary Examiner* — John Fox
(74) *Attorney, Agent, or Firm* — Maginot, Moore & Beck

(57) ABSTRACT

A hydraulic unit comprises a solenoid valve group with at least two solenoid valves having each a valve cartridge and a solenoid subassembly arranged around the valve cartridge. According to the invention, a positioning unit is arranged between at least two adjacent solenoid valves and applies a force to at least two adjacent solenoid valves in such a way that the corresponding solenoid subassembly of the solenoid valve takes a defined radial position relative to the corresponding valve cartridge of the solenoid valve.

20 Claims, 5 Drawing Sheets

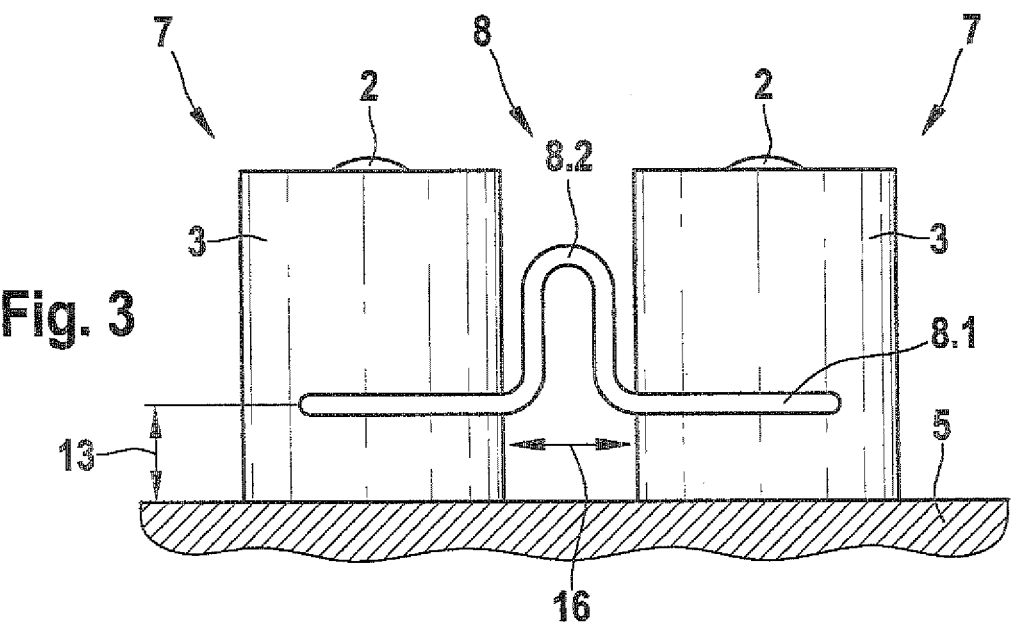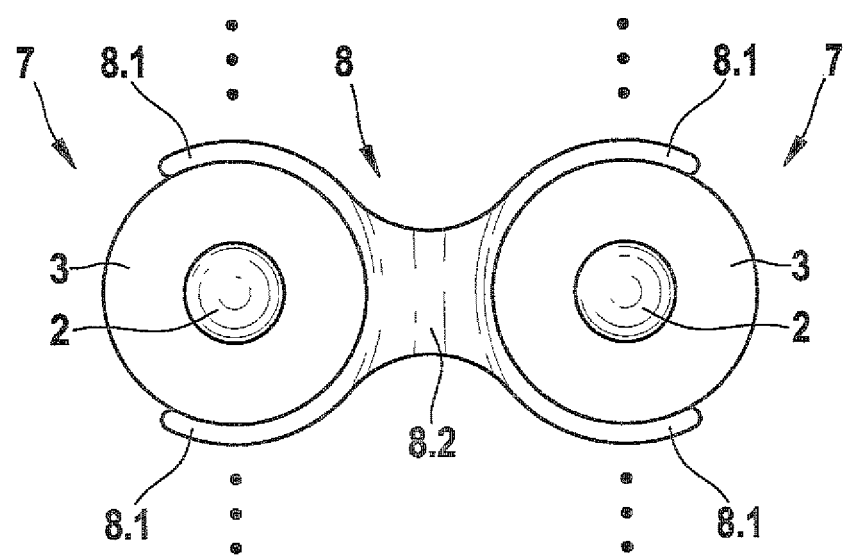

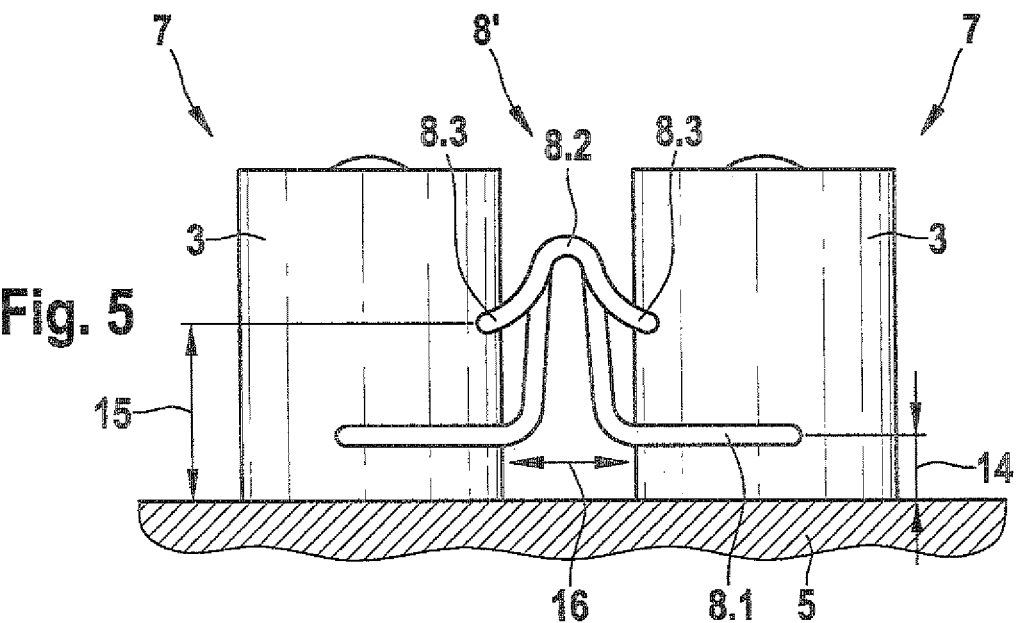
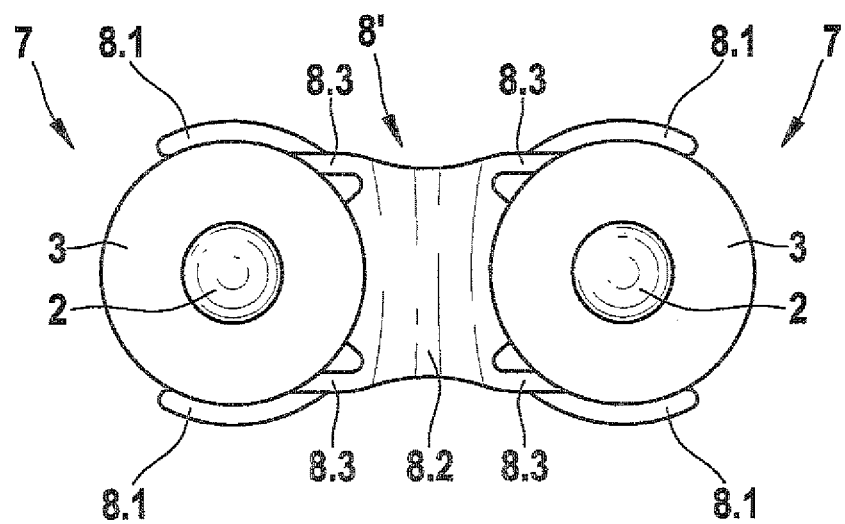

HYDRAULIC UNIT

CROSS-REFERENCE TO RELATED APPLICATION

This application is a 35 USC 371 application of PCT/EP 2006/069253 filed on Dec. 4, 2006.

BACKGROUND OF THE INVENTION

1. Field of the Invention

The invention relates to a hydraulic unit having a solenoid valve group.

2. Description of the Prior Art

In the patent application DE 103 16 643 A1, a solenoid valve is described, which includes a solenoid valve cartridge and a magnet assembly. The above-mentioned solenoid valve cartridge includes a cup-shaped housing, a pole core, and an armature, while the magnet assembly includes a coil body and a winding. The magnet assembly is situated around the solenoid valve cartridge and a radial prestressing element is situated between a threaded bushing and a housing of the magnet assembly so that a radial force is exerted on the magnet assembly in such a way that the magnet assembly assumes a predetermined, definite position in relation to the solenoid valve cartridge.

FIG. 1 is an exploded depiction of a hydraulic unit. The solenoid valve group 10 is installed in a fluid block 4 and is composed of a plurality of solenoid valves that are each composed of a solenoid valve cartridge 2 and a magnet assembly 3. The magnet assemblies 3 are mounted on and contacted via a stamped grid 5. This structural assembly, combined with other components to form a mounting control unit 6, is mounted onto the fluid block 4 with the solenoid valve cartridges 2. FIG. 2 shows a solenoid valve for the hydraulic unit according to FIG. 1, which is used for example in an antilock brake system (ABS), a traction control system (TCS), or an electronic stability program system (ESP system). As is clear from FIG. 2, in addition to the magnet assembly 3, which includes a coil body 3.1 with a winding 3.2, an electrical contact 3.3, a housing 3.4, and a covering washer 3.7, the solenoid valve 7 also has a valve cartridge 2, which includes a pole core 2.1, a tappet 2.2, a capsule 2.3, a valve insert 2.4, and a return spring 2.5. During the manufacture of the solenoid valve 7, the capsule 2.3 and the valve insert 2.4 of the valve cartridge 2 are attached to one another by press-fitting and a sealed weld 2.8 hydraulically seals the valve cartridge 2 in relation to the atmosphere. In addition, the valve insert 2.4 absorbs the compressive forces occurring in the hydraulic system and transmits them via a caulking flange 2.9 to a caulking region on the fluid block 4. In addition, the valve insert 2.4 accommodates the so-called valve member 2.6, which includes a sealing seat 2.7 into which the tappet 2.2 plunges in a sealed fashion in order to perform the sealing function of the solenoid valve 7. As is also clear from FIG. 2, an inner circumference of the housing 3.4 with a first diameter 11 constitutes a first contact region 3.5 for an interface between the solenoid valve cartridge 2 and the magnet assembly 3 while an inner circumference of the coil body 3.1 with a second diameter 12 constitutes a second contact region 3.6 for the interface between the solenoid valve cartridge 2 and the magnet assembly 3. Because of the tolerances of the respective parts and the desired simple plug-in assembly, the interface is encumbered with play in the diameters 11 and 12. This means that the relative position between the solenoid valve cartridge 2 and the magnet assembly 3 has a radial degree of freedom that can influence the variation of characteristic function values of the solenoid valve 7: there can be large differences among the solenoid valves 7 of a solenoid valve group 10 when the solenoid valve cartridge 2 and the magnet assembly 3 are centered in relation to each other—which can occur randomly, when the magnet assembly 3 rests against the solenoid valve cartridge 2 on one side, or when the magnet assembly 3 assumes intermediate positions between the two extreme positions.

SUMMARY AND ADVANTAGES OF THE INVENTION

The hydraulic unit according to the invention, has the advantage over the prior art that a positioning unit is situated between at least two adjacent solenoid valves of a solenoid valve group, which positioning unit exerts a force on at least two adjacent solenoid valves so that each magnet assembly of the adjacent solenoid valves assumes a definite radial position in relation to an associated valve cartridge of the adjacent solenoid valves. The positioning unit according the invention reciprocally aligns the magnet assemblies of the at least two adjacent solenoid valves, i.e. at an interface between a magnet assembly and a solenoid valve cartridge, the magnet assembly of each of the adjacent solenoid valves rests with its inner diameter radially against the associated solenoid valve cartridge. As a result, the magnet assemblies of the adjacent solenoid valves always assume a predetermined, definite position in relation to the associated solenoid valve cartridge. It is consequently advantageously possible, through the resulting action of force, to achieve a definite positioning between the relevant solenoid valve cartridges and the associated magnet assemblies of the solenoid valves of the solenoid valve group of the hydraulic unit according to the invention, independent of the various individual part dimensions that occur within the tolerance limits. In addition, a degree of freedom that is responsible for the variation of function values of the solenoid valves can be eliminated, which makes it possible to achieve an increase in the part quality of the involved solenoid valves of the solenoid valve group so that a more precise control of the hydraulic assembly is possible and, for example, injection quantities and actuating pressures can be more precisely metered.

It is particularly advantageous that in order to align the magnet assemblies of the adjacent solenoid valves, the positioning unit has first guide elements, which are coupled to one another by a spring element and act on the respective magnet assemblies of the adjacent solenoid valves at a first predeterminable height. The spring element, which is embodied, for example, in the form of a spring tab, exerts a radial force on each of the magnet assemblies. In order to align the magnet assemblies of the adjacent solenoid valves, the positioning unit can include second guide elements, which are coupled to one another via the spring element and act on the respective magnet assemblies of the adjacent solenoid valves at a second predeterminable height, thus producing a plurality of force application points on the magnet assemblies of the adjacent solenoid valves.

The first guide elements and/or the second guide elements are, for example, embodied in the form of parenthesis-shaped forms, which are adapted to the external shape of the magnet assembly and encompass the magnet assembly over a substantial portion of its circumference or at least partially encompass the magnet assembly. Consequently, in order to fasten the positioning unit, the first guide elements can be embodied, for example, so that they encompass the magnet assembly over a substantial portion of its circumference and the second guide elements can be embodied so that they rest only partially against the circumference of the magnet assembly. Alternatively, in order to fasten the positioning unit, the second guide elements can, for example, be embodied so that they encompass the solenoid assembly over a substantial portion of its circumference and the first guide elements can be embodied so that they rest only partially against the circumference of the magnet assembly. Alternatively, the first guide elements and/or the second guide elements can be embodied as struts that each act on the magnet assembly at certain points.

In one embodiment of the hydraulic unit according to the invention, the positioning unit is situated between two solenoid valves adjacent to each other in a first direction and produces a force that acts along the first direction between the two adjacent solenoid valves.

In another embodiment of the hydraulic unit according to the invention, two parallel positioning units, which are each situated between two solenoid valves adjacent to each other in the first direction, are coupled by a spacer element extending in a second direction so that a stabilizing action in two directions is produced; the first and second directions can extend perpendicular to each other. This advantageously permits more than two magnet assemblies to be coupled to one another and aligned in relation to one another, thus making it possible to advantageously reduce the total number of parts and to avoid a twisting of the positioning unit, with the accompanying problems, during assembly.

The positioning units can be manufactured out of materials, which have little or no magnetic conductivity, and are manufactured, for example as injection-molded plastic parts.

BRIEF DESCRIPTION OF THE DRAWINGS

The drawings show advantageous embodiments of the invention described below, as well as the conventional exemplary embodiment explained above for the sake of better comprehension of these advantageous embodiments.

FIG. 3 is a schematic side view of a first exemplary embodiment of a solenoid valve assembly for the hydraulic unit shown in FIG. 1, FIG. 4 is a schematic top view of a part of the solenoid valve assembly shown in FIG. 3, FIG. 5 is a schematic side view of a second exemplary embodiment of a solenoid valve assembly for the hydraulic unit shown in FIG. 1, FIG. 6 is a schematic top view of a part of the solenoid valve assembly shown in FIG. 5.

DESCRIPTION OF THE PREFERRED EMBODIMENT

Figure 1:
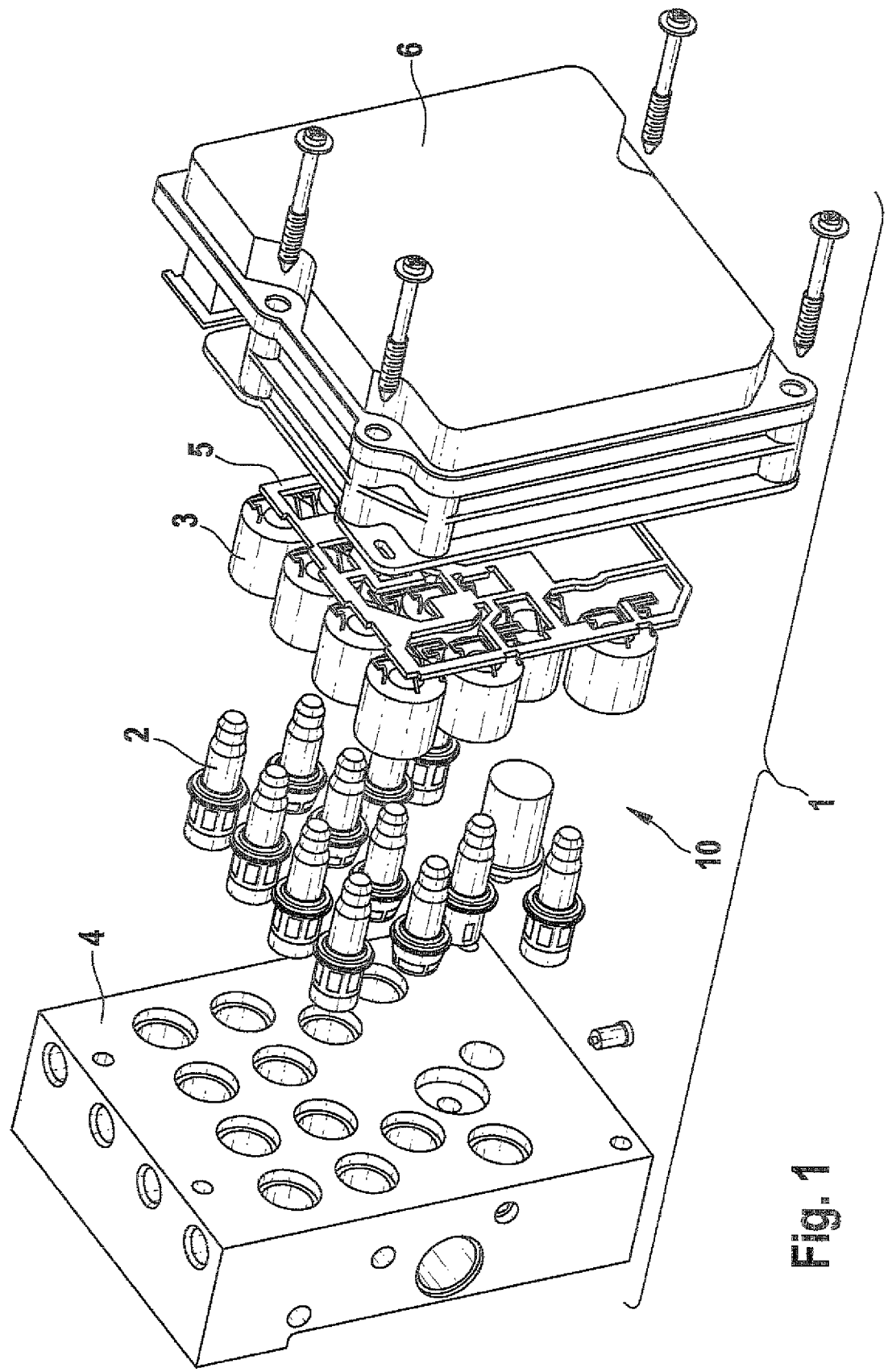
FIG. 1 is a schematic exploded depiction of a hydraulic unit.
Figure 2:
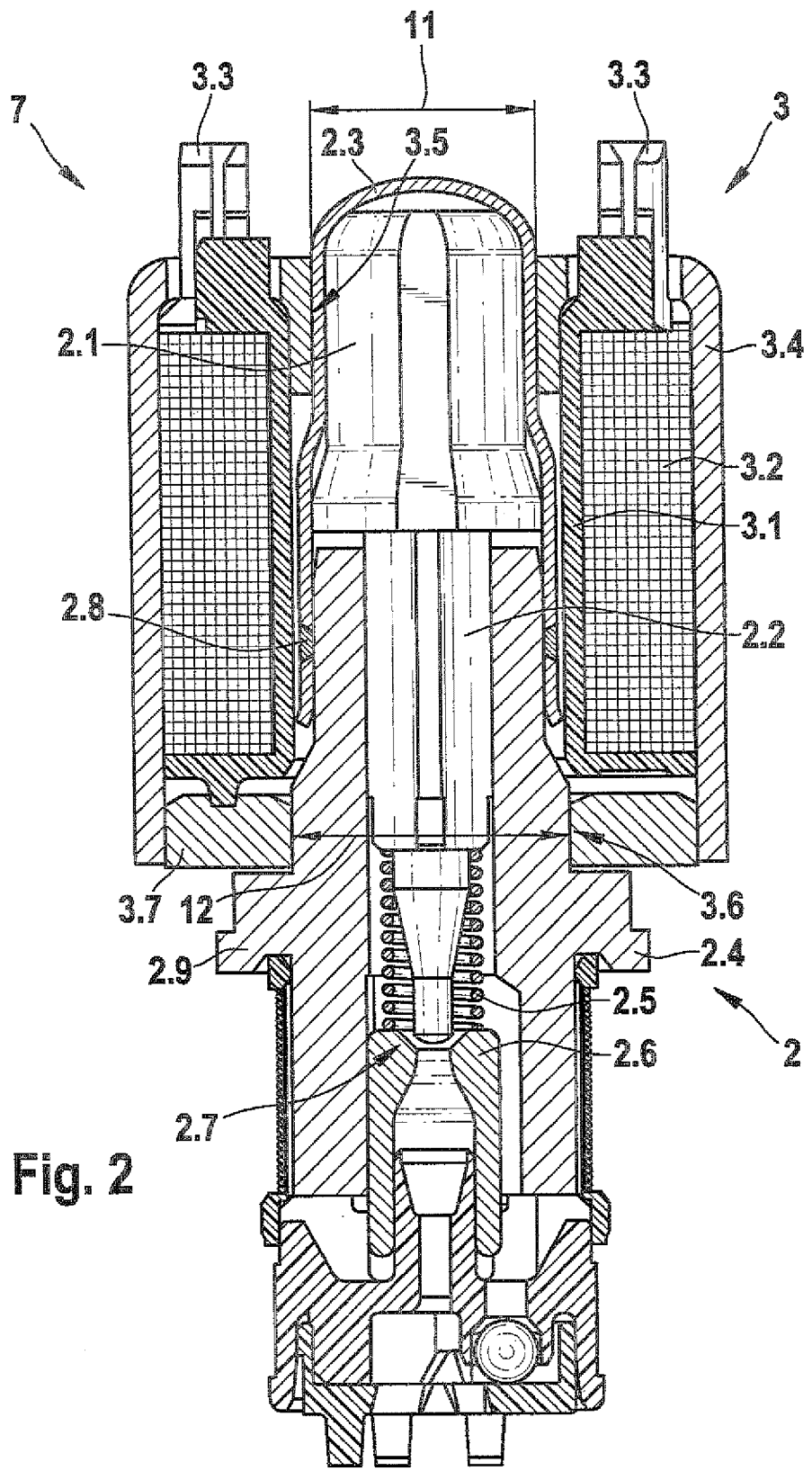
FIG. 2 is a schematic sectional depiction of a solenoid valve for the hydraulic unit shown in FIG. 1.

As is clear from FIGS. 3 and 4, a first exemplary embodiment of a solenoid valve assembly for a hydraulic unit has a plurality of solenoid valves 7, of which two adjacent solenoid valves 7 are shown by way of example. The two adjacent solenoid valves 7 each include a valve cartridge 2 and a magnet assembly 3 situated around the valve cartridge 2. Between the two adjacent solenoid valves 7, a positioning unit 8 is provided, which exerts a force 16 on the two adjacent solenoid valves 7 so that each magnet assembly 3 assumes a definite radial position in relation to the associated valve cartridge 2. As is also clear from FIGS. 3 and 4, in order to align the magnet assemblies 3 of the adjacent solenoid valve 7, the positioning unit 8 has first guide means 8.1, which are connected to each other by means of a tab-like spring element 8.2 and act on each magnet assembly 3 of the adjacent solenoid valves 7 at a predeterminable height 13. The first guide means 8.1 are embodied in the form of parenthesis-shaped forms and are adapted to the external shape of the magnet assembly 3. In order to attach the positioning unit 8 to the magnet assemblies 3 of the adjacent solenoid valves 7, the parenthesis-shaped forms 8.1 each encompass a substantial portion of the circumference of the corresponding magnet assembly 3. In order to align the solenoid valves 7 of the solenoid valve assembly for the hydraulic unit, a plurality of positioning units 8 are provided, each of which is situated between two respective solenoid valves 7 that are adjacent to each other in one direction.

As is clear from FIGS. 5 and 6, a second exemplary embodiment of a solenoid valve assembly for a hydraulic unit has a number of solenoid valves 7, of which two adjacent solenoid valves 7 are shown by way of example, which are embodied in a fashion analogous to the first exemplary embodiment. The two adjacent solenoid valve 7 each likewise include a respective valve cartridge 2 and a magnet assembly 3 situated around the valve cartridge 2. Between the two adjacent solenoid valves 7, a positioning unit 8' is provided, which exerts a force 16 on the two adjacent solenoid valves 7 so that each magnet assembly 3 assumes a definite radial position in relation to the associated valve cartridge 2. By contrast with the first exemplary embodiment shown in FIGS. 3 and 4, in order to improve the alignment of the magnet assemblies 3 of adjacent solenoid valves 7, the positioning unit 8' has first guide means 8.1 and second guide means 8.3, which are coupled to each other via a tab-like spring element 8.2 and act on the respective magnet assembly 3 of the adjacent solenoid valves 7 at different predeterminable heights 14, 15. Analogous to the first exemplary embodiment shown in FIGS. 3 and 4, the first guide means 8.1 are embodied as parenthesis-shaped forms that are adapted to the external shape of the magnet assembly 3 and, in order to attach to the magnet assemblies 3, each encompass a substantial portion of the circumference of the corresponding magnet assembly 3. The second guide means 8.3 in the second exemplary embodiment shown are adapted to the external shape of the magnet assembly 3, partially encompass the circumference of the corresponding magnet assembly 3, and have struts that act on certain points of the magnet assemblies 3 at the second height 15. In order to align the solenoid valves 7 of the solenoid valve assembly for the hydraulic unit, several positioning units 8 are provided, each of which is situated between two solenoid valves 7 that are adjacent to each other in one direction.

Figure 7:
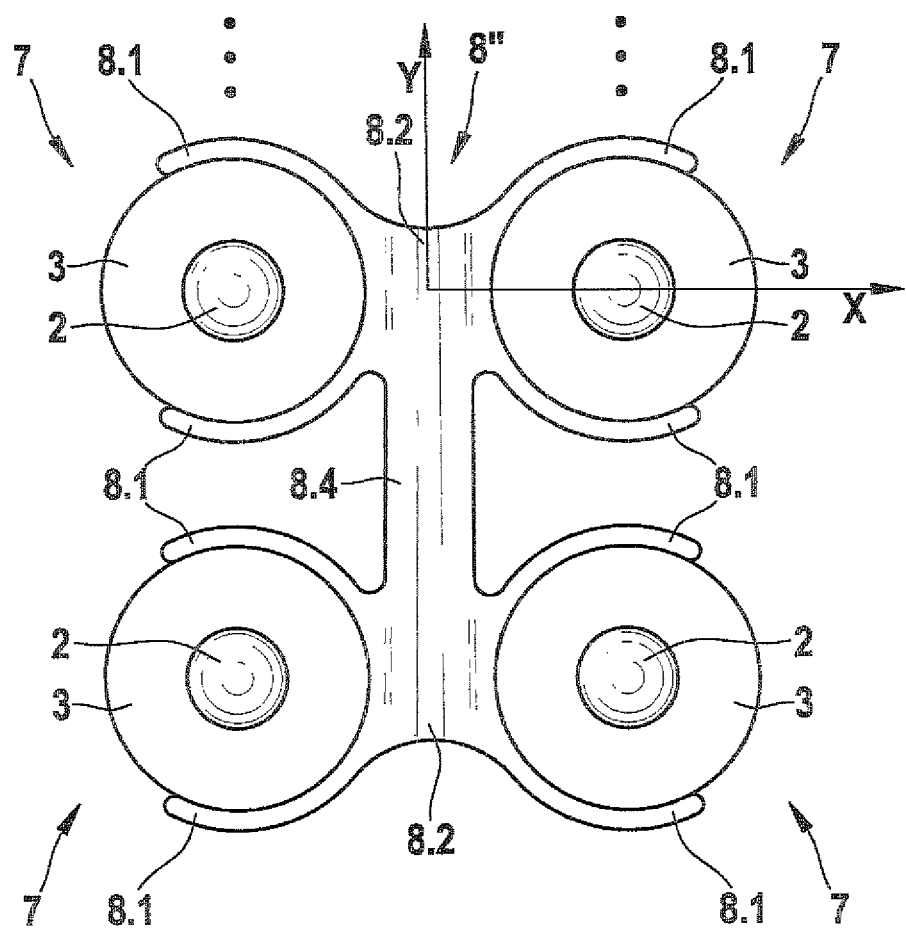
FIG. 7 is a schematic top view of a third exemplary embodiment of a solenoid valve assembly for the hydraulic unit shown in FIG. 1.

As is clear from FIG. 7, a third exemplary embodiment of a solenoid valve assembly for a hydraulic unit includes a plurality of solenoid valves 7, of which four adjacent solenoid valves 7 are shown by way of example. Analogous to the first and second exemplary embodiments, the adjacent solenoid valves 7 each have a valve cartridge 2 and a magnet assembly 3 situated around the valve cartridge 2. Between the adjacent solenoid valves 7, a positioning unit 8" is provided that produces a force between solenoid valves that are adjacent to each other in a first direction X, which force acts along the first direction X between the adjacent solenoid valves 7. The force 16 applied causes each magnet assembly 3 to assume a definite radial position in relation to the associated valve cartridge 2. By contrast with the first exemplary embodiment according to FIGS. 3 and 4, in the positioning unit 8" of the third exemplary embodiment, two parallel positioning units 8, which are each embodied analogously to the first exemplary embodiment with first guide means 8.1 and each act between two solenoid valves 7 situated adjacent to each other in the first direction X, are coupled to each other by means of a spacer element 8.4 that extends in a second direction Y so that a stabilizing action in two directions X, Y is produced, with the first and second directions X, Y preferably extending perpendicular to each other. The coupling of more than two adjacent solenoid valves 7 advantageously reduces the overall number of parts and makes it possible to prevent a twisting of the positioning unit 8" around the X axis, with the accompanying assembly- and function-related problems.

Alternatively, in an embodiment that is not shown, the spacer element 8.4 extending in a second direction Y can serve to couple two parallel positioning units 8', which are embodied analogous to the second exemplary embodiment, with first and second guide means 8.1 and 8.3 that each act at a different predeterminable height 14, 15 between two solenoid valves 7 situated adjacent to each other in the first direction X. In addition, in order to align the solenoid valves 7 of the solenoid valve assembly for the hydraulic unit, a plurality of positioning units 8" can be provided, which are each situated between four solenoid valves 7 that are adjacent to one another in two directions X and Y. Also in an exemplary embodiment that is not shown, the positioning unit 8' can include additional spacer elements 8.4 extending in the second direction Y, which couple additional parallel positioning units 8 and 8' extending in the first direction X.

A control unit 6, which acts on the solenoid valve assemblies 3 by means of a stamped grid 5, for example in accordance with FIG. 1, has suitable components that exert sufficient axial forces to prevent the magnet assemblies 3 from lifting away from the solenoid valve cartridges 2. In order to assure an easy, secure assembly and to produce the spring action, the proposed positioning units 8, 8', 8" can be manufactured out of suitable (steel) plates or plastics. In addition, the material should preferably absorb no secondary magnetic influence or very little of it in order to avoid reducing the magnetic force produced for the solenoid valve function. By virtue of their manufacturing processes (e.g. injection molding), plastics offer the potential of greater degrees of freedom in component design than metal materials, but must be appropriately selected with regard to dimensional stability under the influences of temperature and time.

The foregoing relates to the preferred exemplary embodiment of the invention, it being understood that other variants and embodiments thereof are possible within the spirit and scope of the invention, the latter being defined by the appended claims.

The invention claimed is:
1. A hydraulic unit with a solenoid valve group, comprising:
 a first solenoid valve having (i) a first valve cartridge defining a longitudinal axis and (ii) a first magnet assembly defining a first axial length and being situated around the first valve cartridge, the first magnet assembly having a first exterior sidewall;
 a second solenoid valve having (i) a second valve cartridge and (ii) a second magnet assembly defining a second axial length and being situated around the second valve cartridge, the second magnet assembly having a second exterior sidewall;
 a mounting element on which the first and second solenoid valves are directly mounted and through which the first and second solenoid valves are electrically contacted; and
 a positioning unit situated between the first and second solenoid valves and configured to exert a force on the first and second solenoid valves so that the first magnet assembly assumes a first definite radial position with respect to the first valve cartridge and the second magnet assembly assumes a second definite radial position with respect to the second valve cartridge,
 wherein the positioning unit has a guide member for aligning the first and second magnet assemblies, the guide member including (i) a first projection that contacts the first exterior sidewall over a portion of the first axial length that is less than the entire first axial length, (ii) a second projection that contacts the second exterior sidewall over a portion of the second axial length that is less than the entire second axial length, and (iii) a spring element interposed between the first and second projections configured to generate the force acting on the first and second solenoid valves, and
 wherein the spring element is contained entirely within a space between the first exterior sidewall and the second exterior sidewall.

2. The hydraulic unit as recited in claim 1, wherein the first and second projections of the guide member are adapted to and encompass a portion of a perimeter of the first and second external sidewalls that is less than the entire perimeter of the first and second sidewalls, respectively.

3. The hydraulic unit as recited in claim 2, wherein the first and second projections of the guide member are adapted to and encompass a substantial portion of the perimeter of the first and second external sidewalls, respectively.

4. The hydraulic unit as recited in claim 1, wherein:
 the first projection of the guide member includes at least two struts that act at different locations on the first external sidewall, and
 the second projection of the guide member includes at least two additional struts that act at different locations on the second external sidewall.

5. The hydraulic unit as recited in claim 1, wherein first and second solenoid valves are situated adjacent to each other in a first direction defined perpendicular to the longitudinal axis and the force exerted by the positioning unit acts along the first direction between the first and second solenoid valves.

6. The hydraulic unit as recited in claim 5, further comprising:
 a third solenoid valve having a third valve cartridge and a third magnet assembly situated around the third valve cartridge;
 a fourth solenoid valve having a fourth valve cartridge and a fourth magnet assembly situated around the fourth valve cartridge; and
 an additional positioning unit situated between the third and fourth solenoid valves, the additional positioning unit exerting a force on the third and fourth solenoid valves so that the third magnet assembly assumes a third definite radial position with respect to the third valve cartridge and the fourth magnet assembly assumes a fourth definite radial position with respect to the fourth valve cartridge,
 wherein the third and fourth solenoid valves are situated adjacent to each other in the first direction and the force produced by the additional positioning unit acts along the first direction between the third and fourth solenoid valves, wherein the additional positioning unit is parallel to the positioning unit, and wherein the positioning unit and the additional positioning unit are coupled to each other by a spacer structure that extends in a second direction defined perpendicular to the first direction so that a stabilizing action is produced in both the first and second directions.

7. The hydraulic unit as recited in claim 1, wherein the positioning unit is formed of a material that has little or no magnetic conductivity.

8. The hydraulic unit as recited in claim 7, wherein the positioning unit is an injection molded plastic part.

9. The hydraulic unit as recited in claim 1, wherein no portion of the first projection of the first projection contacts the mounting element and no portion of the second projection contacts the mounting element.

10. The hydraulic unit as recited in claim 1, wherein the spring element is substantially U-shaped and includes a first branch and a second branch, and wherein the first projection extends from the first branch in a plane transverse to the longitudinal axis and the second projection extends from the second branch in the plane transverse to the longitudinal axis.

11. The hydraulic unit as recited in claim 1, wherein the positioning unit further comprises:

an additional guide member for aligning the first and second magnet assemblies, the additional guide member including (i) a third projection that contacts the first exterior sidewall over a second portion of the first axial length that is less than the entire first axial length and (ii) a fourth projection that contacts the second exterior sidewall over a second portion of the second axial length that is less than the entire second axial length, wherein the spring element is further interposed between the third and fourth projections.

12. The hydraulic unit as recited in claim 11, wherein the third and fourth projections of the additional guide member are adapted to and encompass a substantial portion of a perimeter of the first and second exterior sidewalls that is less than the entire perimeter of the first and second sidewalls, respectively.

13. The hydraulic unit as recited in claim 11, wherein:

the third projection of the additional guide member includes at least two struts that act at different locations on the first external sidewall, and the fourth projection of the additional guide member includes at least two additional struts that act at different locations on the second external sidewall.

14. The hydraulic unit as recited in claim 13, wherein the first and second projections of the guide member are adapted to and encompass a substantial portion of a perimeter of the first and second magnet assemblies that is less than the entire perimeter of the first and second sidewalls, respectively.

15. The hydraulic unit as recited in claim 11, wherein the first and second solenoid valves are situated adjacent to each other in a first direction defined parallel to the longitudinal axis and the force exerted by the positioning unit acts along the first direction between the first and second solenoid valves.

16. The hydraulic unit as recited in claim 15, further comprising:

a third solenoid valve having a third valve cartridge and a third magnet assembly situated around the third valve cartridge;

a fourth solenoid valve having a fourth valve cartridge and a fourth magnet assembly situated around the fourth valve cartridge; and an additional positioning unit situated between the third and fourth solenoid valves, the additional positioning unit exerting a force on the third and fourth solenoid valves so that the third magnet assembly assumes a third definite radial position with respect to the third valve cartridge and the fourth magnet assembly assumes a fourth definite radial position with respect to the fourth valve cartridge, wherein the third and fourth solenoid valves are situated adjacent to each other in the first direction and the force exerted by the additional positioning unit acts along the first direction between the third and fourth solenoid valves, wherein the additional positioning unit is parallel to the positioning unit, and wherein the positioning unit and the additional positioning unit are coupled to each other by a spacer structure that extends in a second direction defined perpendicular to the first direction so that a stabilizing action is produced in both the first and second directions.

17. The hydraulic unit as recited in claim 11, wherein the spring element includes a first branch extending generally parallel to the longitudinal axis and a second branch extending generally parallel to the longitudinal axis, and wherein the first projection extends from an end of the first branch transversely relative to the longitudinal axis and the second projection extends from an end of the second branch transversely relative to the longitudinal axis.

18. The hydraulic unit as recited in claim 17, wherein the spring element is substantially U-shaped.

19. A hydraulic unit with a solenoid valve group, comprising:

a first solenoid valve having (i) a first valve cartridge defining a longitudinal axis and (ii) a first magnet assembly situated around the first valve cartridge, the first magnet assembly having a first exterior sidewall;

a second solenoid valve having (i) a second valve cartridge and (ii) a second magnet assembly situated around the second valve cartridge, the second magnet assembly having a second exterior sidewall;

a mounting element on which the first and second solenoid valves are directly mounted and through which the first and second solenoid valves are electrically contacted; and a positioning unit situated between the first and second solenoid valves and configured to exert a force on the first and second solenoid valves so that the first magnet assembly assumes a first definite radial position with respect to the first valve cartridge and the second magnet assembly assumes a second definite radial position with respect to the second valve cartridge, wherein the positioning unit has a guide member for aligning the first and second magnet assemblies, the guide member including (i) a first projection that contacts the first exterior sidewall, (ii) a second projection that contacts the second exterior sidewall, and (iii) a spring element interposed between the first and second projections configured to generate the force acting on the first and second solenoid valves, wherein the spring element includes a first branch extending generally parallel to the longitudinal axis and a second branch extending generally parallel to the longitudinal axis, wherein the first projection extends from an end of the first branch transversely relative to the longitudinal axis and the second projection extends from an end of the second branch transversely relative to the longitudinal axis, wherein no part of the spring element contacts the first exterior sidewall of the first solenoid valve, and wherein no part of the spring element contacts the second exterior sidewall of the second solenoid valve.

20. The hydraulic unit as recited in claim 19, wherein the spring element is substantially U-shaped.

* * * * *